(12) United States Patent
Våland

(10) Patent No.: US 7,855,674 B2
(45) Date of Patent: Dec. 21, 2010

(54) METHOD AND RADAR SYSTEM FOR COHERENT DETECTION OF MOVING OBJECTS

(75) Inventor: Per Atle Våland, Oslo (NO)

(73) Assignee: Telefonaktiebolaget L M Ericsson (Public), Stockholm (SE)

( * ) Notice: Subject to any disclaimer, the term of this patent is extended or adjusted under 35 U.S.C. 154(b) by 19 days.

(21) Appl. No.: 12/373,644

(22) PCT Filed: Jul. 13, 2006

(86) PCT No.: PCT/NO2006/000276

§ 371 (c)(1),
(2), (4) Date: Jan. 13, 2009

(87) PCT Pub. No.: WO2008/007964

PCT Pub. Date: Jan. 17, 2008

(65) Prior Publication Data

US 2009/0315754 A1    Dec. 24, 2009

(51) Int. Cl.
*G01S 13/04* (2006.01)
*G01S 13/56* (2006.01)
*G01S 7/28* (2006.01)
*G01S 7/523* (2006.01)
*G01S 15/04* (2006.01)
*G01S 15/50* (2006.01)
*G01S 13/00* (2006.01)
*G01S 15/00* (2006.01)

(52) U.S. Cl. ............... 342/28; 342/27; 342/82; 342/89; 342/118; 342/134; 342/135; 342/145; 342/175; 342/189; 342/195; 367/87; 367/93; 367/94; 367/99; 367/100

(58) Field of Classification Search .......... 342/13–22, 342/27, 28, 82–103, 118, 134–145, 175, 342/189, 195, 70–72, 202–204, 23, 192–197; 367/87, 93, 94, 99, 100; 375/130–153; 331/78; 708/100, 200, 250–256

See application file for complete search history.

(56) References Cited

U.S. PATENT DOCUMENTS

| | | | | |
|---|---|---|---|---|
| 2,914,762 | A * | 11/1959 | Gross et al. | 342/203 |
| 3,903,525 | A | 9/1975 | Mullins et al. | |
| 4,040,055 | A | 8/1977 | Donahue et al. | |
| 4,513,285 | A * | 4/1985 | Pike et al. | 342/98 |
| 4,626,856 | A | 12/1986 | Pierson et al. | |
| 4,768,035 | A | 8/1988 | Thurber et al. | |
| 5,731,781 | A * | 3/1998 | Reed | 342/135 |
| 6,121,915 | A * | 9/2000 | Cooper et al. | 342/70 |
| 6,271,786 | B1 * | 8/2001 | Huff et al. | 342/16 |
| 6,392,585 | B2 * | 5/2002 | Huff et al. | 342/16 |
| 6,714,286 | B1 * | 3/2004 | Wheel | 342/203 |

* cited by examiner

*Primary Examiner*—Bernarr E Gregory
(74) *Attorney, Agent, or Firm*—Roger S. Burleigh

(57) ABSTRACT

The present invention provides a coherent radar system based on a modification of standard non-coherent radar without Moving Target Indication. Typical radars in this class are Navigation radars which are mass produced with low cost components. These radars utilize a magnetron in the transmitter which is a random phase device. In the present invention, the received signal is extracted just prior to amplitude detection process (where phase information is lost), and digitized using an analogue to digital converter providing coherent detection based on correlation between the transmitted pulse and the received signal.

9 Claims, 2 Drawing Sheets

METHOD AND RADAR SYSTEM FOR COHERENT DETECTION OF MOVING OBJECTS

TECHNICAL FIELD

The present invention relates to the field of target detection, in particular by means of radar systems and in more particular by using radars for coherent detection of moving targets.

BACKGROUND

Radars without moving target indication use a directional antenna and transmit pulses when scanning the horizon. The time from transmission to reception of a pulse provides the range to a reflecting target. By drawing the received signal power versus antenna angle, the resulting image is a representation of the surrounding environment. Navigation radars use this principle to draw land area and other ships on the screen.

FIG. 1 shows a conventional navigation radar system as used on most ships. This system employs a magnetron 12 as the transmitter source. A magnetron is a self-oscillating tube that may deliver a strong signal at a low cost. This is a random phase device, as the heating of the tube during the transmitting pulse will change its resonant frequency and shift the phase of the emitted signal. The signal from the magnetron 12 is lead to a scanning antenna 11. The corresponding reflected or back-scattered signals are received by the antenna 11 and processed in a receiving channel including the components RF amplifier 14, mixer 15, local oscillator 18, Intermediate Frequency amplifier and filter 16, and detector 17. The detector 17 is normally a crystal (diode) amplitude detector. The signals from the detector 17 may be observed on an old fashioned Plan Projection Indicator (not shown), or digitized and observed on a raster display device (computer screen).

To protect the receiving channel from the strong transmitter signal, the signals are routed through a circulator 13. In addition, the receiving channel will be muted or turned off during the transmitting period.

In order to detect targets in a cluttered environment (e.g. over land), a radar has to include means for extracting moving targets from the surrounding clutter. Multiple methods have been used, but may be divided into two main categories:

Non-coherent detection where the detected video (amplitude) signal from two or more antenna scans are compared in amplitude to detect changes, thus not utilising signal phase Coherent detection where signal phase changes from pulse to pulse is used to extract The system illustrated in FIG. 1 may to be used for detecting moving targets, i.e. according to the first alternative, if received signals are stored during a receiving period (scan), and compared with signals received during the subsequent receiving period.

Non coherent moving target indication (MTI) typically is slow (as at least two complete scans of the antenna is needed for detection) and requires that the target moves in the order of one or more resolution cell within the antenna scan time. The sensitivity is also quite low due to the fact that only detected video is used.

Most modern radar systems utilize coherent detection where the signal phase from two or more pulses is compared for detection of target radial speed towards or away from the radar. These systems employ a stable oscillator that is used both for generation of the transmitter carrier frequency and for receiver down conversion. Thus the intermediate frequency signal in the receiver is coherent with the transmitted pulse signal and the received signal phase depends on the target distance. A movement of the target towards or away from the radar corresponding to a fraction of a wavelength will result in a change in the received signal phase.

FIG. 2 shows the elements of such a coherent radar system. Here radar pulses are produced in a signal generator source 28. The generated pulses are modulating the signal from a stable carrier oscillator 212 in a mixer 29. The transmitter pulses are then amplified in a power amplifier 210 filtered in a filter 211 and delivered to the antenna 21 via the circulator 23. On receive the signals are down-converted in the mixer 25 using the carrier oscillator 212. In this way received signals will be coherent with the transmitted pulses. Subsequent pulses are compared after detection in detector 27. This system also includes an RF amplifier 24 following the circulator 23, a mixer 25 and an IF amplifier/filter 26. A moving target will show up as a phase difference between subsequent pulses. Movements as small as a fraction of the carrier wavelength may be detected.

Construction of coherent radars is costly due to the need of phase stability in high power components. Therefore a scheme of coherent-on-receive MTI has previously been employed, especially in high power radars. In this system a fast local oscillator is locked to transmitter phase and frequency during the short period of transmission. After the transmitter pulse, the oscillator system is designed to hold the phase constant in the subsequent receive period. This oscillator is used for down-conversion of the received signal, and thus provides coherent detection even if the transmitter has random phase.

FIG. 3 illustrates this concept in more detail. This system uses a free-running transmitter source 313. Phase coherence is established during receive, as the receiving channel uses a local oscillator 318 that is synchronized with the phase of the transmitting source 313. Also this system includes an RF amplifier 34, mixer 35 and IF filter/amplifier 36.

Coherent-on-receive systems require a phase locking mechanism that is fast enough to lock within the duration of a pulse and is stable enough to provide correct phase in the entire reception period. This is usually done by means of a quite complex phase lock mechanism. The system also requires a stable phase within the pulse, thus increasing the requirements to the expensive transmitter subsystem.

As explained above, existing coherent radar systems are very expensive restricting their use to e.g. surveillance of the airspace around airports. However, coherent radar systems could be very useful in other fields as well, and thus, there is a need for a radar system with similar properties, but at a lower cost.

SUMMARY

The present invention provides a method and system for detection of moving targets. In a particular application, the invention provides a coherent radar system based on a modification of standard non-coherent radar without MTI. Typical radars in this class are Navigation radars which are mass produced with low cost components. These radars utilize a magnetron in the transmitter which not only has random phase from pulse to pulse, but the phase varies throughout the pulse.

The concept is based on extracting the received signal just prior to amplitude detection process (where phase information is lost) and digitising this signal using an analogue to digital converter providing coherent detection based on correlation between the transmitted pulse and the received signal.

The method provides a cost-efficient way to achieve coherent detection and moving target indication using off the shelf low cost components.

Existing methods for coherent radars utilise complex hardware and specially designed electronics in order to achieve the necessary phase stability. This solution puts none of these requirements to the radar system.

In addition, the inventive system may be made more compact than prior art coherent radar systems. This is mainly due to the use of the magnetron, which delivers a large power in a small space. This may allow the use of coherent radar systems in confined spaces that normally will not room such equipment, such as in aeroplanes.

Additionally target detection is enhanced, due to matched filter processing of the received echoes, thus allowing for unintentional or intentional modulation of the pulse.

In particular the invention relates to a method for coherent detection of moving targets, said method including transmitting random phase pulsed signals towards the targets, receiving echo signals produced by said pulsed signals and finally correlating the pulsed signals with the echo signals, as claimed in claim 1 below.

The invention also includes a system with an antenna, a random phase transmitting unit, a signal coupling unit, a receiving unit adapted to transpose received signals to intermediate frequency signals, an A/D (Analogue/Digital) converter adapted to digitize the intermediate frequency signals, and a processing unit adapted to correlate signals emitted by said transmitting unit with received echo signals, as claimed in claim 5.

BRIEF DESCRIPTION OF THE DRAWINGS

The invention will now be described in detail in reference to the appended drawings, in which.

DETAILED DESCRIPTION

The concept of the present invention is based on extracting the received signal just prior to amplitude detection process (where phase information is lost) and digitising this signal using an analogue to digital converter.

Figure 4:
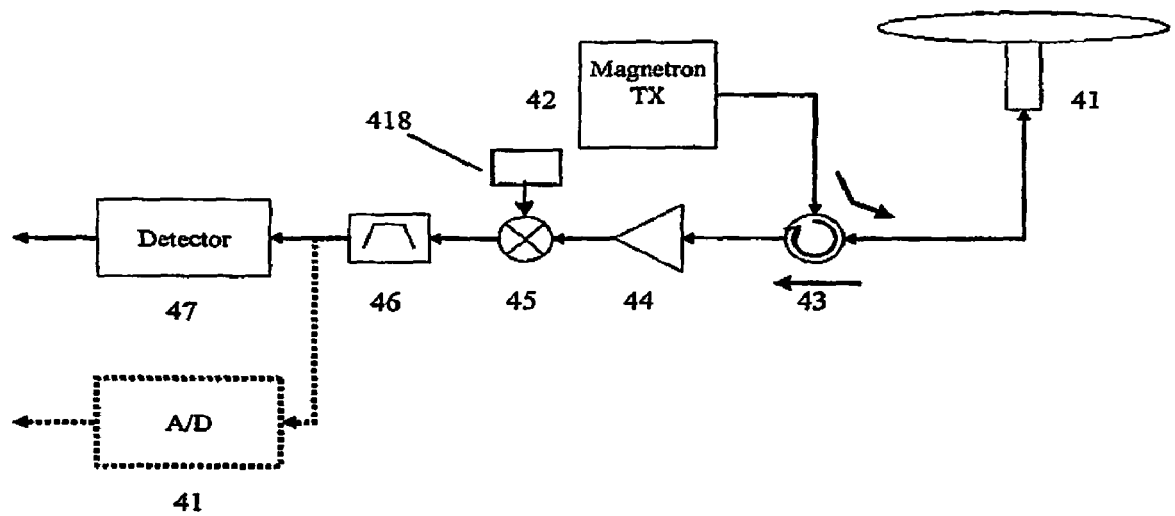
FIG. 4 is a schematic drawing of a radar system according to the present invention.

FIG. 4 illustrates the invention. The system shown in the figure reuses all components of the conventional navigation radar of FIG. 1, such as antenna 41, magnetron 42, circulator 43, pre-amplifier 44, mixer 45, local oscillator 28 and IF filter 46. The amplitude detector 47 may be retained in the system, even though it will have no function regarding the invention.

Figure 1:
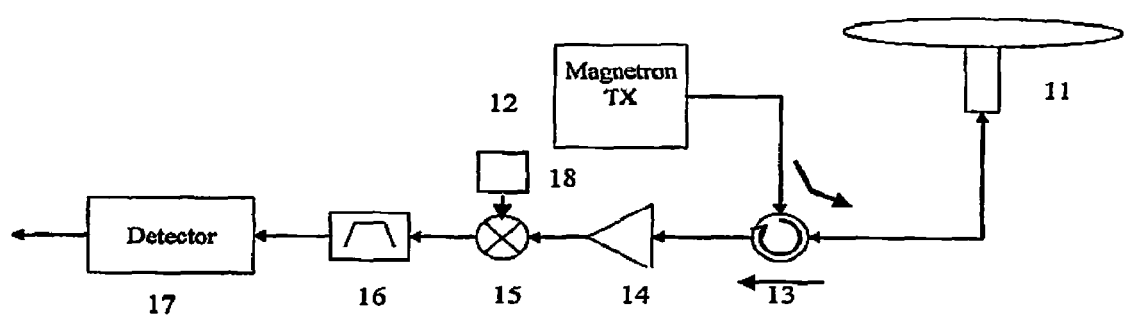
FIG. 1 is a schematic drawing of the main components of a conventional navigation radar (prior art)
Figure 2:
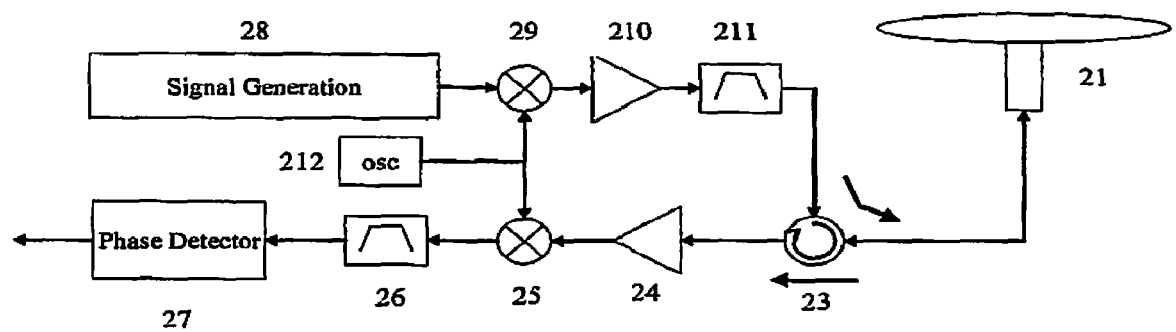
FIG. 2 is a schematic drawing of the main components of a coherent source radar (prior art)
Figure 3:
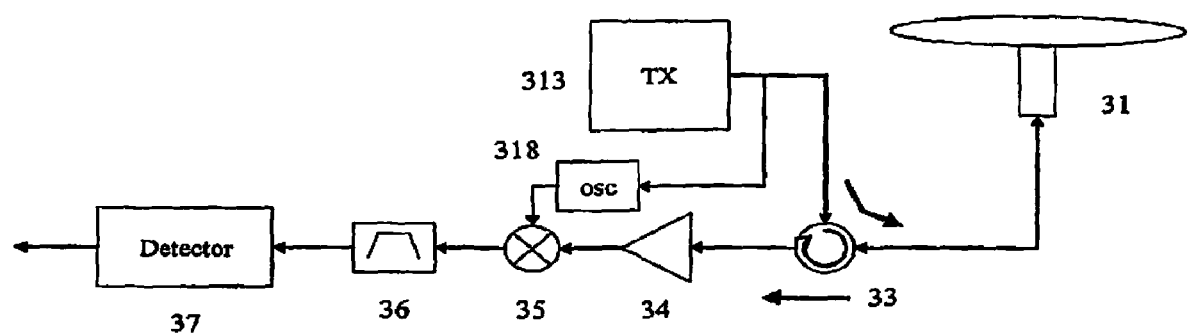
FIG. 3 is a schematic drawing of the main components of a coherent-on receive radar (prior art)

The inventive system has two important differences from the prior art navigation radar in FIG. 1:

The addition of an A/D converter 415 (shown in stippled outline on FIG. 4) digitizing the IF signal, and the receiving chain being turned on even during the transmit period.

Due to the high power in the transmitter system, some of the transmitter signal will leak through the receiver system and arrive at the A/D converter 415. Thus, by starting digitisation just prior to start of transmission and stopping transmission when echoes from the furthest range has been received, the resulting data array output from the A/D converter will contain:

Digitised transmitted pulse (in the start of the array)

Digitised echo reception (in the rest of the array)

By correlating the Digitised echo reception part of the array with the Digitised transmitted pulse part of the array an echo-array with phase intact is provided. This array may then be used for pulse-to-pulse MTI with any coherent MTI method.

The correlation in question is a standard cross correlation product $z_k$:

$$z_k = \sum_{i=1}^{N} x_i \cdot y_{i-k}$$

Where x is the reception part and y is the transmitted pulse part of the array; i and k are indexes in the respective data arrays.

The invention provides a cost-effective coherent radar system with small dimensions. This may enlarge the application of coherent radar systems to e.g. weather radars used in aeroplanes.

In general, the invention may be used in any motion detecting system using self-oscillating transmitters working on any frequency and in any medium. One particular application is in sonar systems using self-oscillating transducers. In many ways such systems correspond closely to navigation radars, and will thus not be described in detail here. By reading the description above, any person skilled in the art will understand how the invention may be utilized in this field as well.

What is claimed is:

1. A method for coherent detection of moving targets, said method comprising the steps of:
    transmitting, using a transmitter, pseudo-random phase pulsed signals towards the targets;
    receiving, using a receiver, echo signals produced by said pulsed signals during both transmitting and receiving periods;
    digitizing, using an analog to digital (A/D) converter, the pulsed signals;
    transposing the echo signals to an intermediate frequency and digitizing, using the A/D converter, the echo signals:
    correlating the digitized pulsed signals with the digitized echo signals using cross correlation $z_k$:

$$z_k = \sum_{i=1}^{N} x_i \cdot y_{i-k}$$

where x is a reception part (echo signals) and y is a transmitted pulse part (pseudo-random phase pulsed signals) of an array and i and k are indexes in respective data arrays.

2. The method as claimed in claim 1, wherein the pulsed signals are radar signals.

3. The method as claimed in claim 1, wherein the pulsed signals are sonar signals.

4. A system for coherent detection of moving targets, said system comprising:
- an antenna;
- a pseudo-random phase transmitting unit;
- a signal coupling unit;
- a receiving unit configured to receive echo signals both during transmitting and receiving periods and transpose received echo signals to intermediate frequency signals
- an analog to digital (A/D) converter configured to digitize transmitted pseudo-random phase signals and digitize the intermediate frequency echo signals; and
- a processing unit adapted to correlate the pseudo-random phase signals emitted by said transmitting unit with received echo signals using cross correlation $z_k$:

$$z_k = \sum_{i=1}^{N} x_i \cdot y_{i-k}$$

where x is a reception part (echo signals) and y is a transmitted pulse part (pseudo-random phase signals) of an array and i and k are indexes in respective data arrays.

5. The system as claimed in claim 4, wherein the system is a radar system.

6. The system as claimed in claim 5, wherein the transmitting unit is a magnetron.

7. The system as claimed in claim 4, wherein the system is a sonar system.

8. The system as claimed in claim 4, wherein the signal coupling unit is a circulator.

9. The system as claimed in claim 4, wherein said transmitting unit and receiving unit are components in a navigation radar device.

* * * * *